Feb. 23, 1937.    S. F. PRINCE    2,071,568
BRAKE BEAM SAFETY SUPPORT
Filed Oct. 12, 1935    2 Sheets-Sheet 1
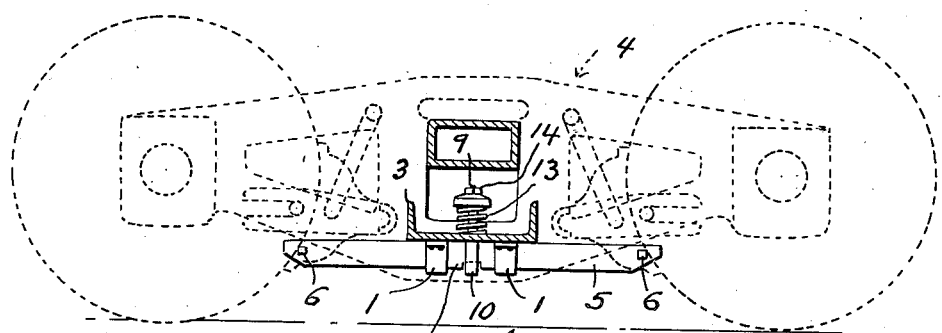
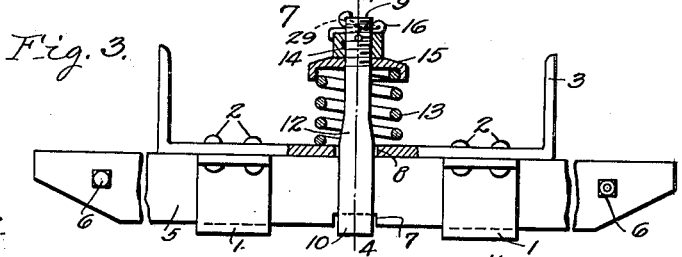
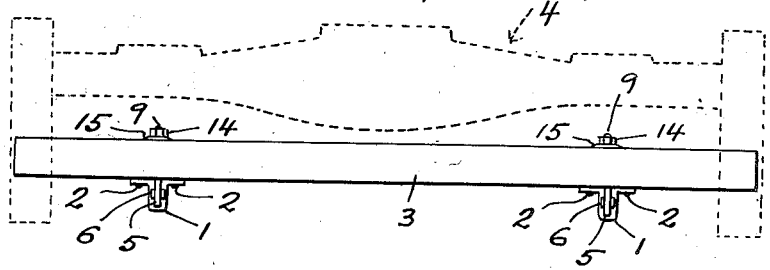
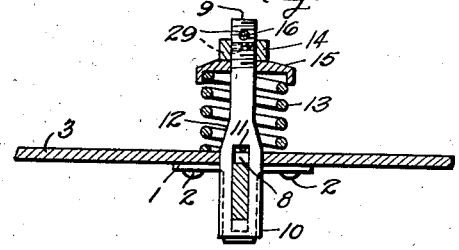
Inventor
Samuel F. Prince
By Clarence A. O'Brien
Attorneys Patented Feb. 23, 1937

2,071,568

UNITED STATES PATENT OFFICE 2,071,568

BRAKE BEAM SAFETY SUPPORT

Samuel F. Prince, Clovis, N. Mex.

Application October 12, 1935, Serial No. 44,770

4 Claims. (Cl. 188—210)

The present invention relates to new and useful improvements in brake beam safety supports particularly for railroad freight cars and has for its primary object to provide, in a manner as hereinafter set forth, a device of this character embodying a novel construction, combination and arrangement of parts through the medium of which defective brake beams may be expeditiously removed and replaced with a minimum of labor.

Other objects of the invention are to provide a brake beam safety support of the aforementioned character which will be comparatively simple in construction, strong, durable, highly efficient and reliable in use, compact, light in weight, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of the invention, the spring pan and bolster of the truck being shown in cross section.

Figure 2 is a front elevational view, showing the invention mounted on the spring pan.

Figure 3 is an enlarged view in side elevation of the invention with parts broken away in section.

Figure 4 is a view in vertical transverse section through the invention, taken substantially on the line 4—4 of Figure 3.

Figure 5:
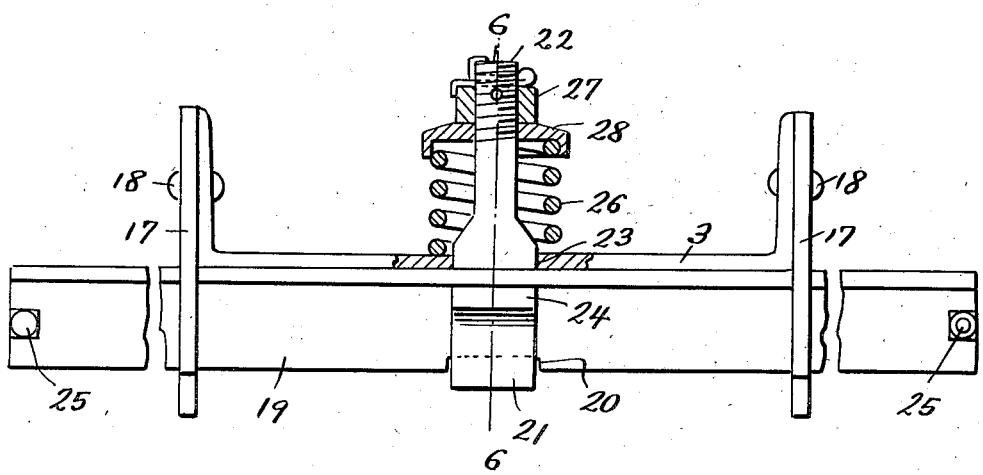
Figure 5 is a view in side elevation of a slightly modified form of the invention with parts broken away in section.

Referring now to the drawings in detail, it will be seen that the reference numeral 1 designates a pair of aligned, substantially U-shaped brackets which are permanently secured, as by rivets 2, beneath the spring pan 3 of the truck, said truck being designated generally by the reference numeral 4.

Slidably mounted in the brackets 1 is a substantially flat, metallic safety bar 5 which, it will be observed, projects beyond the sides of the spring pan 3 for catching and supporting falling brake beams which have broken. Mounted transversely in the end portions of the bar 5 are pins or bolts 6 which function as stops for preventing withdrawal of said bar 5 from the brackets 1. At an intermediate point, the bar 5 has formed in its lower edge a notch 7, the purpose of which will be presently set forth.

Mounted slidably in an opening 8 which is provided therefor in the spring pan 3 is a vertical bar retaining bolt 9, which is provided with a head 10 of polygonal cross section. The head 10 is engageable in the notch 7 and said head 10 has formed therein a vertical slot 11 through which the bar 5 passes. The bolt 9 further includes a tapered neck portion 12 between the head 10 and the shank of said bolt which prevents catching beneath the spring pan 3 when the bolt is depressed.

Encircling the bolt 9 and having its lower end engaged on the spring pan 3 is a tension spring 13. The spring 13 is compressed through the medium of a nut 14 which is threaded on the bolt 9, a cup washer 15 being interposed between said nut 14 and said spring 13. Of course, the upper end of the spring 13 is engaged in the cup washer 15. A cotter pin 16 secures the nut 14 on the bolt 9. It will be noted that the bolt 9 is provided with a plurality of openings 29 for the reception of the cotter pin, thus permitting the nut 14 to be threaded to different positions on said bolt 9 for varying the tension of the spring 13.

It is thought that the operation of the invention will be readily apparent from a consideration of the foregoing. With the bar 5 in the position shown to advantage in Figure 3 of the drawings, the end portions of said bar which project beyond the spring pan 3 will with certainty catch and support falling brake beams which have become broken or detached from their supports. To remove a broken or otherwise defective beam it is only necessary to depress the bolt 9 against the tension of the spring 13 sufficiently to disengage the head 10 from the notch 7, after which the bar 5 may be shifted longitudinally in the brackets 1 to an out-of-the-way position. The tension of the spring 13 will retain the bar 5 in this out-of-the-way position and permit the mechanic to use both hands in the work. However, should it be desired to remove the bar 5 entirely, this may be readily accomplished by simply removing one of the stop bolts or pins 6 in any suitable manner. After a new brake beam has been installed the bar 5 is returned to operative position, as seen in Figure 3, and the bolt 9, under impulsion by the spring 13, again seats in the notch 7. The spring 13 normally holds the bar 5 tightly against the bottom of the spring pan 3 thereby eliminating vibration with its consequent noise and damage. The brackets 1, of course, materially assist the spring 13 in supporting the bar 5 against heavy blows inflicted by falling brake beams.

Figure 6:
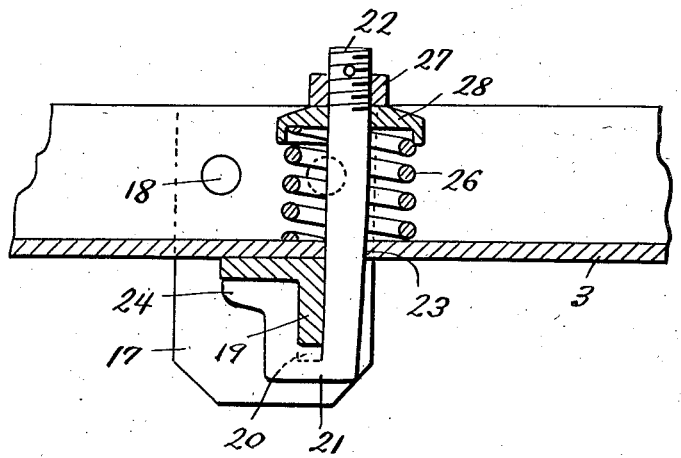
Figure 6 is a view in vertical transverse section, taken substantially on the line 6—6 of Figure 5.

In the modified form of the invention shown in Figures 5 and 6 of the drawings, the reference numeral 17 designates brackets in the form of substantially flat, metallic plates which are secured, as at 18, to the sides of the spring pan 3, said brackets 17 depending from said spring pan and having formed in the lower portions thereof angular slots for slidably receiving an angle iron safety bar 19. As best seen in Figure 6 of the drawings, the horizontal leg of the angle iron safety bar 19 abuts the bottom of the spring pan 3. The vertical leg of the angle iron safety bar 19 has formed therein a notch 20 for the reception of a hook 21 on the lower end of a bolt 22 which extends slidably through an opening 23 which is provided therefor in the bottom of the spring pan 3. The hook 21 slidably embraces the vertical leg of the angle iron safety bar 19. At its free end, the bill of the hook 21 terminates in an enlargement or foot 24 which is engaged beneath the horizontal leg of the angle iron safety bar 19. Stop bolts or pins 25 are provided in the end portions of the bar 19.

A tension spring 26 encircles the bolt 22 and rests on the bottom of the spring pan 3. The spring 26 is tensioned by a nut 27 which is threaded on the bolt 22. A cup washer 28 is interposed between the nut 27 and the spring 26. The operation of the modification illustrated in Figures 5 and 6 is substantially the same as in the arrangement illustrated in Figures 1 to 4, inclusive.

It is believed that the many advantages of a brake beam safety support constructed in accordance with the present invention will be readily understood, and although preferred embodiments of the invention are as illustrated and described, it is to be understood that further modifications and changes in the details of construction may be resorted to which will fall within the scope of the invention as claimed.

What is claimed is:—

1. The combination of a railway car truck having a spring pan, a pair of aligned brackets depending from said spring pan, a bar slidably mounted in said brackets beneath the pan and projecting beyond the sides of said pan for receiving and supporting broken brake beams, said bar having a notch in its lower portion at an intermediate point, a bolt extending slidably through the spring pan and engaged in the notch for releasably securing the bar against sliding movement in the brackets, and a spring operatively connected to the bolt for yieldingly urging said bolt into the notch.

2. The combination of a railway car truck having a spring pan, a pair of aligned brackets depending from said pan, a bar slidably mounted in the brackets beneath the pan and projecting beyond the sides of said pan for receiving and supporting broken brake beams, said bar having a notch therein at an intermediate point, stop members mounted in the end portions of said bar for preventing withdrawal of the same from the brackets, a bolt extending slidably through the bottom of the spring pan, means on the lower end of the bolt engageable in the notch for releasably securing the bar against sliding movement in the brackets, an adjustable nut threadedly mounted on the bolt, a cup washer mounted on the bolt beneath the nut, and a tension spring mounted on the bolt between the cup washer and the spring pan for yieldingly engaging the bolt with the bar and for yieldingly clamping said bar against the spring pan.

3. The combination of a railway car truck including a spring pan, substantially U-shaped brackets secured to the bottom of said spring pan and depending therefrom, a bar slidably mounted in said brackets and projecting beyond the sides of the spring pan for receiving and supporting broken brake beams, said bar having a notch in the lower portion thereof at an intermediate point, a bolt extending slidably through the bottom of the spring pan, said bolt including a head having a slot therein, the bar extending slidably through said slot, said head being engageable in the notch for releasably securing the bar against sliding movement in the brackets, and a spring mounted on the spring pan and operatively connected to the bolt for yieldingly urging said bolt into engagement with the bar and for yieldingly clamping said bar against the bottom of the spring pan.

4. The combination of a railway car truck including a spring pan, substantially flat brackets secured to the sides of said spring pan and depending therefrom, an angle iron bar slidably mounted in the depending portions of the brackets, said bar projecting beyond the sides of the spring pan for receiving and supporting broken brake beams, the horizontal leg of said angle iron bar being engaged with the bottom of the spring pan, the vertical leg of said angle iron bar having a notch in its lower edge at an intermediate point, stops mounted in the end portions of said bar for preventing withdrawal of said bar from the brackets, a bolt extending slidably through the bottom of the spring pan, a hook on the lower end of the bolt engageable in the notch for releasably securing the bar against sliding movement in the brackets, a foot on the free end of the hook engageable beneath the horizontal leg of the bar, and a coil spring mounted on the bottom of the spring pan and operatively connected to the bolt for engaging the hook in the notch and for yieldingly clamping the bar against the bottom of the spring pan.

SAMUEL F. PRINCE.